United States Patent [19]

Glass

[11] 4,174,754
[45] Nov. 20, 1979

[54] ADJUSTABLE BOOT TYPE COMPOSITION HORSESHOE

[75] Inventor: Neel W. Glass, Cuyamungue, N. Mex.

[73] Assignee: Les-Kare, Inc., Santa Fe, N. Mex.

[21] Appl. No.: 861,286

[22] Filed: Dec. 16, 1977

[51] Int. Cl.$^2$ .............................. A01L 3/00; A01L 5/00
[52] U.S. Cl. .................................................... 168/18
[58] Field of Search ................................ 168/18, 1, 2, 3

[56] References Cited

U.S. PATENT DOCUMENTS

| 122,972 | 1/1872 | Sloat | 168/18 |
|---|---|---|---|
| 3,703,209 | 11/1972 | Glass | 168/18 |
| 3,732,929 | 5/1973 | Glass | 168/18 |

*Primary Examiner*—Hugh R. Chamblee
*Attorney, Agent, or Firm*—Henry Heyman

[57] ABSTRACT

An improved horseshoe of molded composition having a tread portion shaped to cover the entire bottom of a horse's hoof and a flexible upwardly extending envelope portion shaped to conform to the walls of a horse's hoof and having a pair of triangular folds in the front portion to provide contractile flexibility, and an adjustable tensioning member being a flexible cable which is fastened at its ends to the front portion and which loops back on both sides of the horseshoe to engage sleeves secured the opposed surfaces of brackets affixed to the inside of the side walls of the horseshoe, and over-center tensioning means secured to the front part of the horseshoe for engagement with the flexible cable for snugging the shoe securely to the horse's hoof, the brackets also having inwardly downwardly slanting projecting barbs for non-slipping engagement with the side walls of the horse's hoof when the shoe is snugged on the horse's hoof.

3 Claims, 4 Drawing Figures

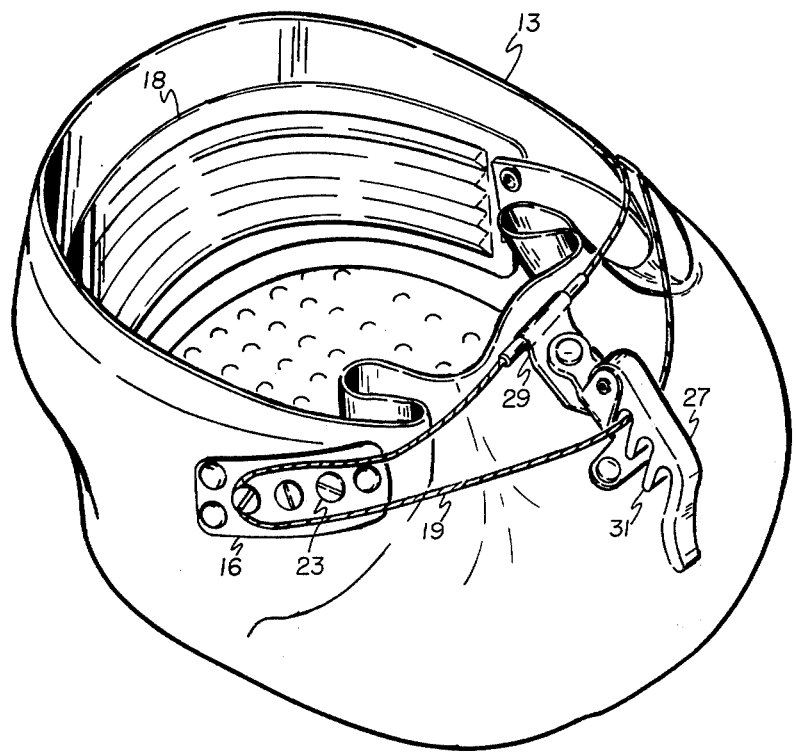
Fig. 1 (Old Art)
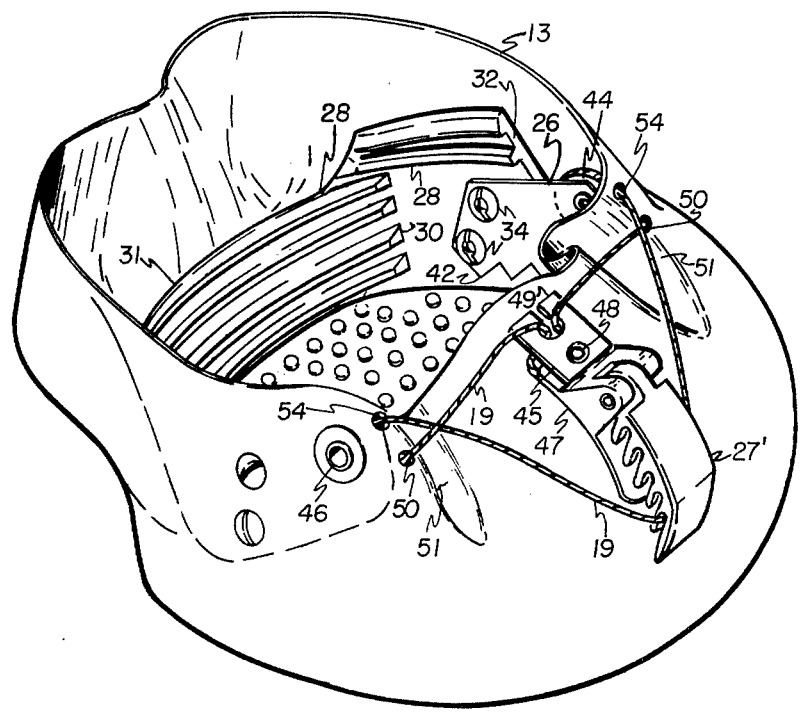
Fig. 2

ADJUSTABLE BOOT TYPE COMPOSITION HORSESHOE

This application relates to an improvement in composition horseshoes particularly of the type disclosed in U.S. Pat. No. 3,732,929 issued May 15, 1973 to Neel W. Glass and in U.S. Pat. No. 3,703,209 issued Nov. 21, 1972 to Neel W. Glass. The patents disclose a horseboot or horseshoe having a sole and a somewhat flexible envelope for surrounding the horse's hoof below the coronary band. The envelope has a pair of re-entrant folds one on each side wall of the envelope on an upper portion of the side wall. Tensioning means engaging brackets fastened to the external surface of the sidewalls. Each of the brackets have a plurality of outwardly directed projections to the end that adjustability in tensioning is afforded by selection of the appropriate projection. In general, that arrangement has worked effectively, but it has been found to be desirable to avoid external brackets. In some cases, when a horse has worked in the brush or among fallen trees, the external brackets have collided with obstacles and have been bent, broken or even torn off the shoe. In addition it may happen that a horse's feet contact each other and the external brackets or cables become damaged. To avoid those problems entirely and to obtain additional engagement between the hoof and the horseshoe, it is a prime objective of the present invention to provide internal brackets for engagement with the tensioning device.

It is another object to provide side brackets on the interior of the horseshoe walls for supporting pulleys or sliding shoes for adjustable engagement with the tensioning member.

It is still another object to provide barbs on the inside side brackets for additional retention of the horseshoe on the horse's hoof.

Another objective is to provide bracket means for securing the tensioning means to the front of the horseshoe in such a manner that additional adjustability in the length of the tensioning means is afforded.

The above objectives, together with other objectives and advantages which will subsequently become apparent, reside in the details of the construction, arrangement and combination of the several parts and features as are more fully hereinafter described and claimed, reference being made to the accompanying drawings made a part hereof wherein like numerals refer to like parts throughout, and in which:

FIG. 1 is a downwardly inclined perspective view of the horseboot of the old art.

FIG. 2 is a downwardly inclined perspective view of the horseboot of the present invention.

Figure 3:
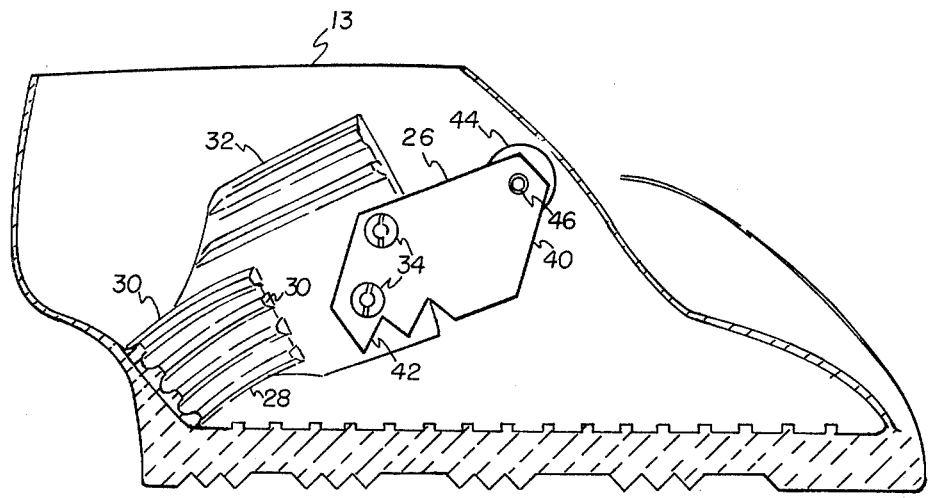
FIG. 3 is a side elevation of the cross-section on vertical plane 3—3 of FIG. 2.

Referring to the figures of the drawing, the horseboot of the prior art is shown in FIG. 1 as well as in U.S. Pat. No. 3,732,929. It is seen that there is a continuous cable 19 which engages external side plates 16 and an over-center toggle buckle 27. The side plates 16 are provided with a plurality of projections 23 to provide adjustability in tensioning the cable on hooves of various sizes. Additional length adjustment is provided by the plurality of hooks 31 in the over-center toggle. The midpoint of the tensioning cable 19 is affixed to the front of the boot by bracket 29. Side plates 16 with cable engaging projections 23 are external to the boot and susceptible to tangling with underbrush, fallen trees and rocks.

Referring to FIG. 2, the improved horseboot of the present invention is shown. The cable engaging side plates 26 are secured inside the boot side walls 13. The boot is provided internally with a strap 28 having elongated downwardly pointing serrated ridges 30. The concept of a serrated strap per se is shown in the old art, notably U.S. Pat. No. 3,732,929 and only the modified features are part of the present invention.

Serrated strap 28 comprises an intermediate elongated portion 31 and expanded end portions 32. The strap is affixed at each end to the side wall of the boot along with the rearward end of side plates 26 by a pair of bolts 34 and nuts known as Chicago nuts or fasteners.

Figure 4:
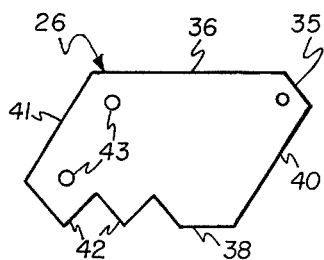
FIG. 4 is a side elevation of a detail.

Side plate 26 as shown in FIGS. 2, 3 and 4 is generally of slightly elongated rhomboid shape, the longer edges being the top and bottom edges are numbered 36 and 38 respectively, and the shorter edges being the front and rear edges are numbered 40 and 41 respectively. The side plate is provided with two bolt holes 43 adjacent edge 41 which on installation is the vertically inclined rearward edge. Bottom edge 38 is provided with inwardly inclined teeth 42.

A slide shoe 44 is mounted on a rivet 46 on the plate 26 proximate the front upper edge 35 formed by chamfering the corner formed by the intersection of sides 36 and 40. The corner formed by the intersection of sides 36 and 40 is chamfered away to avoid interference with tensioning cable 19 when it is threaded over the slide shoe as shown in FIG. 2. The slide shoe can be a rotatable sheave mounte on rivet 46. Referring to FIG. 2, cable 19 is secured to cable anchoring bracket 45 in any convenient manner as by securing the ends together in a compression sleeve (not shown) and passing the eye so formed around bracket securing rivet 48 between buckle hinge plate 47 and the material of the boot envelope.

It will be noted that the right and left hand plates 26 are not identical but are mirror images. The teeth 42 are always inclined inwardly of the boot wall, and the slide shoe 44 is mounted between the outer surface of each plate 26 and the side wall of the boot.

Cable 19 passes from bracket 45 to the right and the left to pass through lower aperture 50 in the outer fold 51 on each side of the boot. Lower perforations 50 are positioned tangential to the lower part of slide shoe 44. The cable passes over each slide shoe and exits from the interior of the boot through upper apertures 54. The cable is lastly engaged by over-center buckle 27'.

From the foregoing it is seen that the constriction mechanism for securing the horseshoe of the present invention to a horse's hoof is a continuous loop comprising serrated strap 28, side plates 26, cable slips 44, cable 19, bracket 45 and overcenter buckle 27'. Serrated strap 28 engages the cartilege portion of the horse's foot beneath the bulbs, and cooperates with the constriction of the re-entrant folds in the front of the boot to snugly confine the horseshoe on the hoof. The inwardly downwardly inclined teeth 42 on the side plates 26 contribute the final touch to non-failing attachment of the horseshoe. No projections external to the side walls of the horseshoe are present to snag on obstacles to cause damage to the boots, or to trip or injure the horse.

Bracket 45 is provided with a keyhole slot formed by prongs 49 to provide additional adjustability in the length of cable 19. If the cable need be shortened, a turn or more is taken about the prongs 49 on either or both sides of the keyhole slot.

What I claim is:

1. An improved composition molded shoe for horses comprising a sole and integral walls conforming in shape to a horse's foot, a re-entrant fold on each side of the front shoe wall having the fold creases lying in the plane substantially that of the front of the hoof, a pair of brackets symmetrically located and affixed to the shoe upper portions rearward of and proximate the re-entrant folds, each of said brackets being generally rhombic shaped and adapted to be affixed inside the shoe side walls, a cable engaging grooved means affixed to each of said brackets at a front upper portion, a plurality of inwardly and downwardly inclined teeth on the lower edge of said brackets, a elongated composition strap having downwardly inclined serrations positioned inside the shoe in approximately a semi-circle around the inside of the rear part of the shoe, means attaching the ends of the strap to the shoe side walls and the brackets, a continuous loop binding cable, a pair of vertically spaced apertures in each front portion of the shoe side wall located to be tangential, substantially to the top and bottom of cable engaging grooved means, a cable anchoring bracket affixed to the upper midpoint of the shoe front wall, means affixing the cable to said bracket, said cable then dividing to the right and to the left of the front of the shoe, passing into the shoe through the lower apertures, engaging the cable engaging grooved means, passing out of the shoe through the upper apertures for engagement with over-center buckle means.

2. The improved composition molded shoe for horses of Claim 1 in which the cable engaging grooved means is a sheave, means rotatably affixing the sheave to the brackets.

3. The improved composition molded shoe for horses of claim 1 in which the cable attaching bracket is provided with a keyhole slot whereby the length of the free part of the cable can be adjusted by looping the cable about the bracket prongs formed between the keyhole slot and the edges of the bracket.

* * * * *